United States Patent
Boser et al.

(10) Patent No.: US 12,359,917 B2
(45) Date of Patent: Jul. 15, 2025

(54) PRECISION GYROSCOPE MODE-MATCHING INSENSITIVE TO RATE INPUT

(71) Applicant: THE REGENTS OF THE UNIVERSITY OF CALIFORNIA, Oakland, CA (US)

(72) Inventors: Bernhard E. Boser, Berkeley, CA (US); Burak Eminoglu, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 281 days.

(21) Appl. No.: 18/130,999

(22) Filed: Apr. 5, 2023

(65) Prior Publication Data
US 2023/0304799 A1 Sep. 28, 2023

Related U.S. Application Data

(63) Continuation of application No. PCT/US2021/055244, filed on Oct. 15, 2021.
(Continued)

(51) Int. Cl.
*G01C 19/5621* (2012.01)
*G01C 19/5776* (2012.01)
*G01C 25/00* (2006.01)

(52) U.S. Cl.
CPC ..... *G01C 19/5776* (2013.01); *G01C 19/5621* (2013.01); *G01C 25/005* (2013.01)

(58) Field of Classification Search
CPC ............ G01C 19/5776; G01C 19/5621; G01C 25/005; G01C 19/5726
See application file for complete search history.

(56) References Cited

U.S. PATENT DOCUMENTS 5,987,984 A * 11/1999 Artzner .................. G01D 18/00
73/497
8,151,641 B2 4/2012 Geen
(Continued)

FOREIGN PATENT DOCUMENTS

WO 2022082018 4/2022

OTHER PUBLICATIONS

ISA/US, United States Patent and Trademark Office (USPTO), International Search Report and Written Opinion issued Jan. 11, 2022, related PCT international application No. PCT/US2021/055244, pp. 1-8, with claims examined, pp. 9-14.
(Continued)

*Primary Examiner* — David J Bolduc
(74) *Attorney, Agent, or Firm* — O'BANION & RITCHEY LLP; John P. O'Banion

(57) ABSTRACT

A precision gyroscope which provides mode matching which is insensitive to rate input in response to continuously monitoring the split between the resonances of the drive and sense modes. A calibration signal, having at least one modulated term whose carrier is synchronous with the excitation in the drive resonator is utilized to modify the feedback signal in the sense resonator. The gyroscope thus does not suffer from corruption of, or from, the rate measurement; whereas the frequency of the calibration signal can be chosen independently of the bandwidth of the rate input.

18 Claims, 2 Drawing Sheets

Related U.S. Application Data

(60) Provisional application No. 63/093,190, filed on Oct. 17, 2020.

(56) References Cited

U.S. PATENT DOCUMENTS

| | | | | |
|---|---|---|---|---|
| 10,082,404 | B1* | 9/2018 | Ge | G01C 25/005 |
| 10,247,600 | B2 | 4/2019 | Kook | |
| 2002/0083757 | A1* | 7/2002 | Geen | G01C 19/5719 73/1.37 |
| 2006/0260382 | A1 | 11/2006 | Fell | |
| 2011/0197674 | A1* | 8/2011 | Prandi | G01C 19/5762 73/504.12 |
| 2014/0000365 | A1* | 1/2014 | Aaltonen | G01C 19/5762 73/504.12 |
| 2015/0143905 | A1* | 5/2015 | Kuisma | G01P 15/131 73/504.12 |
| 2017/0102248 | A1* | 4/2017 | Maurer | G01C 19/5712 |
| 2017/0328712 | A1* | 11/2017 | Collin | H03M 3/458 |
| 2018/0128674 | A1* | 5/2018 | Kook | G01H 13/00 |
| 2018/0245946 | A1 | 8/2018 | Weinberg | |
| 2018/0274924 | A1* | 9/2018 | Mecchia | B81B 7/008 |
| 2018/0274941 | A1 | 9/2018 | Quartiroli | |
| 2019/0145773 | A1 | 5/2019 | Collin | |
| 2021/0278213 | A1* | 9/2021 | Aaltonen | G01C 19/5776 |

OTHER PUBLICATIONS

Challoner, A.D. et al. "Boeing Disc Resonator Gyroscope," Proceedings of 2014 IEEE/ION Position, Location and Navigation Symposium PLANS 2014, Monterey, CA, 201, pp. 1-3.

Cho, Jae Yoong et al. "1.5-Million Q-Factor Vacuum-Packaged Birdbath Resonator Gyroscope (BRG)," 2019 IEEE 32nd International Conference on Micro Electro Mechanical Systems (MEMS), Seoul, 2019, pp. 210-213.

Marx, Maximilian et al. "9.4 A 27µW 0.06 mm2 Background Resonance Frequency Tuning Circuit Based on Noise Observation for a 1.71 mW CT-ΔΣ MEMS Gyroscope Readout System With 0.9°/h Bias Instability," 2017 IEEE International Solid-State Circuits Conference (ISSCC), pp. 164-165, Feb. 2017.

Sharma, Ajit et al. "A Sub-0.2 degree/hr Bias Drift Micromechanical Silicon Gyroscope With Automatic CMOS Mode-Matching," IEEE Journal of Solid-State Circuits, vol. 44, issue No. 5, May 2009, pp. 1593-1608.

Sonmezoglu, Soner et al., "An automatically mode-matched MEMS gyroscope with wide and tunable bandwidth," Journal of Microelectromechanical Systems, vol. 23, No. 2, Apr. 2014, pp. 284-297.

Ezekwe, Chinwuba D. et al., et al., "A Mode-Matching ΣΔ Closed-Loop Vibratory Gyroscope Readout Interface With a 0.004deg/s/rt-Hz Noise Floor Over a 50 Hz Band," IEEE Journal of Solid-State Circuits, vol. 43, No. 12, Dec. 2008, pp. 3039-3048.

Yesil, Ferhat et al., "An automatic mode matching system for a high Q-factor MEMS gyroscope using a decoupled perturbation signal," in 2015 Transducers 2015 18th International Conference on Solid-State Sensors, Actuators and Microsystems (Transducers), Anchorage, AK, 2015, pp. 1148-1151.

Prikhodko, Igor P., et al., "Half-a-Month Stable 0.2 Degree-Per-Hour Mode-Matched MEMS Gyroscope," 2017 IEEE International Symposium on Inertial Sensors and Systems (Inertial), Kauai, HI, 2017, pp. 15-18.

* cited by examiner

PRECISION GYROSCOPE MODE-MATCHING INSENSITIVE TO RATE INPUT

CROSS-REFERENCE TO RELATED APPLICATIONS

This application claims priority to, and is a 35 U.S.C. § 111(a) continuation of, PCT international application number PCT/US2021/055244 filed on Oct. 15, 2021, incorporated herein by reference in its entirety, which claims priority to, and the benefit of, U.S. provisional patent application Ser. No. 63/093,190 filed on Oct. 17, 2020, incorporated herein by reference in its entirety. Priority is claimed to each of the foregoing applications.

The above-referenced PCT international application was published as PCT International Publication No. WO 2022/082018 A1 on Apr. 21, 2022, which publication is incorporated herein by reference in its entirety.

STATEMENT REGARDING FEDERALLY SPONSORED RESEARCH OR DEVELOPMENT

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to mode matching in gyroscopes, and more particularly to mode matching which is insensitive to rate input.

2. Background Discussion

Numerous mode-matched gyroscopes include a means for continuously measuring the difference of the resonant frequencies of the drive and sense resonators and then using further means, for instance electrostatic tuning, to adjust the resonant frequency of the drive mode or sense mode, or both, to force the difference to be zero.

However, accurately measuring the difference between resonant frequencies presents a challenge. In view of this difficulty some researchers try instead to extract the frequency split from the noise profile of the sense resonator. Unfortunately, this solution suffers from limited accuracy and tracking speed and therefore often fails to meet the requirements of precision gyroscopes. Other researchers attempt to extract the frequency split by measuring the amplitude or phase response of the sense mode resonator; however, angular rate directly affects the split measurement. A further approach is to inject a sinusoidal calibration signal into the sense resonator. Yet, since rate measurement and calibration occur simultaneously, care must be taken in this case to avoid interaction. Specifically, the calibration signal must not corrupt the rate measurement, and the extracted frequency split must not depend on the rate signal.

The present state of the art is to choose the frequency of the calibration signal such that it is outside the bandwidth of the rate signal. Unfortunately, this reduces the signal-to-noise ratio of the calibration and consequently the precision of the estimated frequency split.

Accordingly, a need exists for gyroscopes with improved mode matching. The present disclosure fulfills that need and provides additional benefits.

BRIEF SUMMARY

An apparatus and method for continuously monitoring the split between the resonances of the drive and sense modes in a precision gyroscope. While the disclosure utilizes a periodic calibration signal, it does not suffer from corruption of, or from, the rate measurement.

Consequently, the frequency of the calibration signal can be chosen independently of the bandwidth of the rate input and instead set by the required tracking bandwidth of the mode split estimate. The latter is typically dominated by environmental variations, such as temperature and on the order of 1 Hz or less in typical implementations.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

DETAILED DESCRIPTION

1. Single Sense Axis Gyroscope

Figure 1:
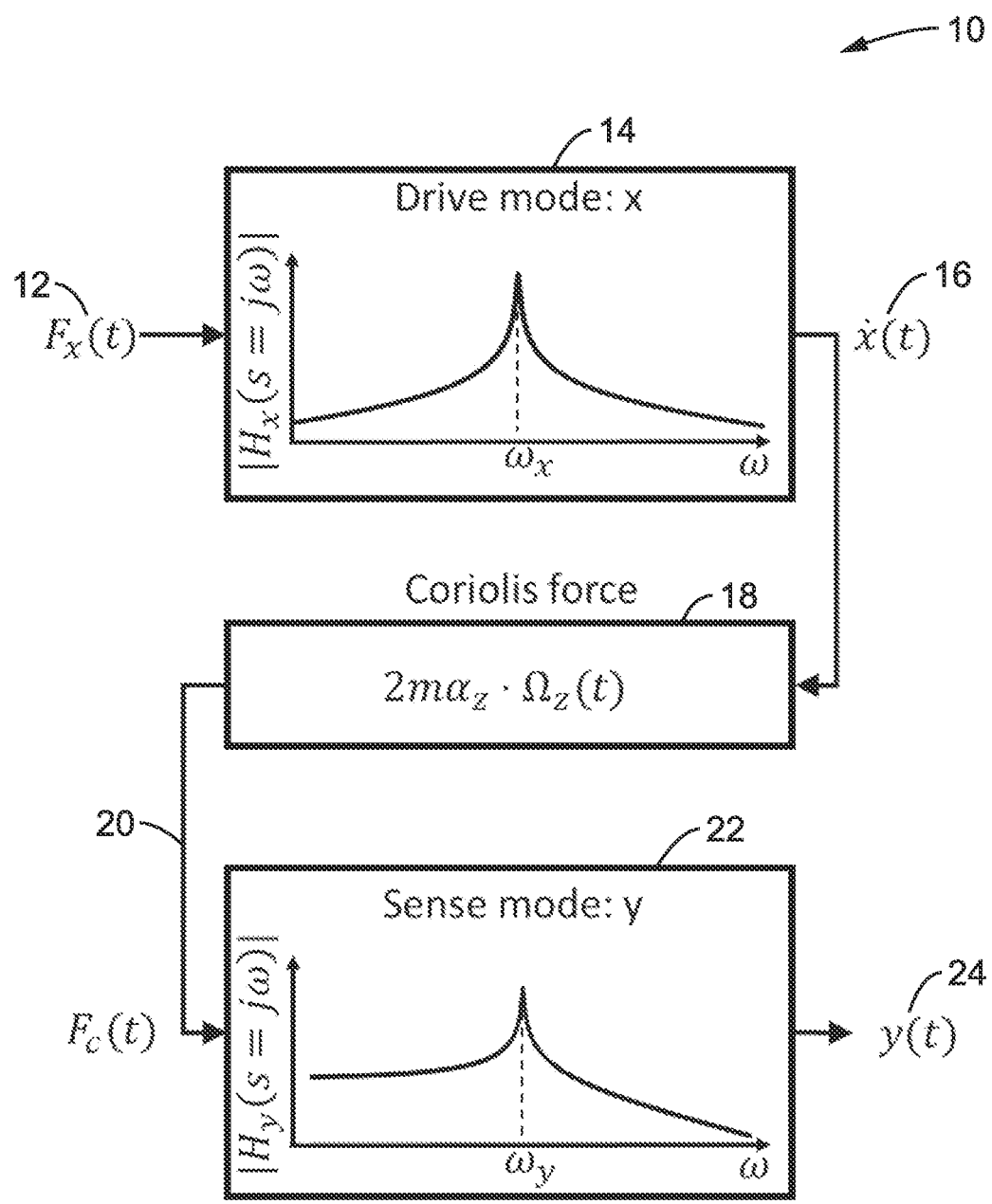
FIG. 1 is a block diagram showing a gyroscope modeled as two coupled resonators, according to at least one embodiment of the present disclosure.

FIG. 1 illustrates an example embodiment 10 of a gyroscope with a single sense axis can by modeled as two coupled resonators 14 and 22 capable of vibration in orthogonal axes x and y with resonant frequencies $\omega_x$ and $\omega_y$, quality factors $Q_x$ and $Q_y$, and spring constants $k_x$ and $k_y$, respectively. An excitation force $F_x(t)$ 12 is coupled to drive resonator 14, whose velocity $\dot{x}(t)$ 16 is output, and leads to Coriolis force 18 (proportional to $\dot{x}(t)$) which provides drive signal $F_c(t)$ 20 into sense mode resonator 22 having sense output $y(t)$ 24.

In many implementations, the modes are dedicated as drive x and sense y, respectively. The electromechanical transfer functions $|H_x(s=j\omega)|$ and $|H_y(s=j\omega)|$ of the drive and sense mode resonators have high-Q band-pass characteristics around the resonance frequencies of $\omega_x$ and $\omega_y$.

Accordingly, the frequency responses for the x and y resonators are given by:

$$H_x(s) = \frac{s}{k_x} \cdot \frac{1}{1 + \frac{s}{\omega_x Q_x} + \left(\frac{s}{\omega_x}\right)^2} \quad (1)$$

$$H_y(s) = \frac{1}{k_y} \cdot \frac{1}{1 + \frac{s}{\omega_y Q_y} + \left(\frac{s}{\omega_y}\right)^2}$$

The drive mode x is excited, typically using a feedback oscillator circuit, omitted from FIG. 1 for simplicity, to a sinusoidal motion at its resonant frequency $\omega_x$ with constant displacement or velocity amplitude.

An angular rate input $\Omega_z(t)$ about the third orthogonal z axis results in a force, usually called Coriolis force 18, at the input of sense mode y that is proportional to the velocity $\dot{x}(t)$ 16, resulting at a vibration at the output of the sense resonator, y, with amplitude proportional to $\Omega_z(t)$. Coriolis force is a coupling from drive to sense mode with the gain of $2m\alpha_z \cdot \Omega_z(t)$ where m is modal mass of the suspended structure having two degree-of-freedom (DOF) and $\alpha_z$ is the angular gain (also known as slip factor or Bryan's factor) of the transducer. In typical gyroscope implementations the amplitude of the vibrations y(t) of the sense resonator are small. Then the Coriolis force at the input of the drive resonator is negligible and has been omitted from the diagram.

Provided that the resonant frequencies of the x and y modes are equal, i.e., $\omega_x = \omega_y$, the amplitude of the vibration at the output of the sense resonator y is amplified by its quality factor $Q_y$. Typically, $Q_y$ is large (for example in excess of 1000), translating into significantly enhanced sensitivity and a commensurate increase in rate measurement accuracy that is less susceptible to errors such as noise.

For high quality factor $Q_y$, the amplitude of vibration at the output of the sense resonator can be large, resulting in nonlinearity and other errors that impair the accuracy of the rate measurement.

Figure 2:
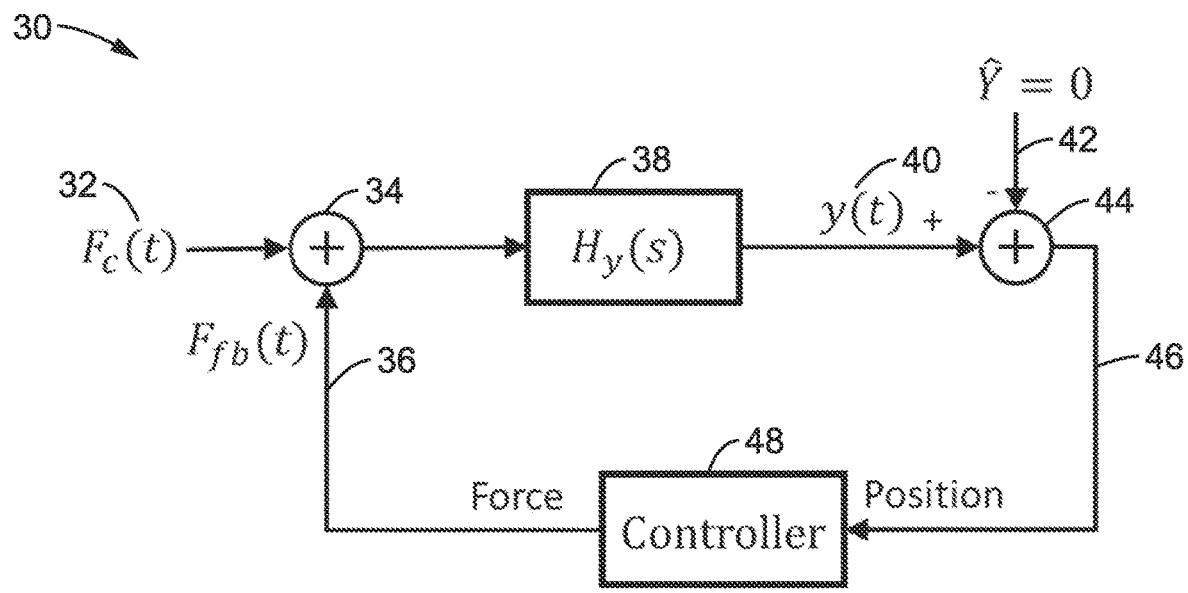
FIG. 2 is a block diagram of a sense resonator with position (force) feedback, according to at least one embodiment of the present disclosure.

FIG. 2 illustrates an example embodiment 30 of feedback for the sense resonator. Most implementations use feedback around the sense resonator. The Coriolis force $F_c(t)$ 32 is summed 34 with feedback $F_{fb}(t)$ 36 as input to sense resonator $H_y(s)$ 38. The signal amplitude y(t) 40 at the output of sense resonator is compared 44 to the desired amplitude $\hat{Y}$ 42, which is typically zero. The position signal 46 is converted to the feedback force $F_{fb}(t)$ 36 through electro-mechanical controller 48 and this feedback force is applied to the input of the resonator to null the vibration at the output of the sense resonator. The controller block typically includes the transduction of position to electrical signal, analog/digital signal acquisition and control, and the transduction of electrical signal to force. The position feedback zeroes out the position y(t). Other implementations instead null the velocity $\dot{y}(t)$ at the output of the sense resonator. The method for mode-matching described below applies to both cases.

The above cited increased sensitivity by a factor $Q_y$ is contingent on the resonant frequencies of the sense and drive mode resonators, $\omega_x$ and $\omega_y$, being equal. For full benefit, the matching must be better than $1/Q_y$, for example $(\omega_x - \omega_y)/\omega_x \ll 1/Q_y$, which usually far exceeds the fabrication accuracy.

3. Continuous Tuning Gyroscope

Figure 3:
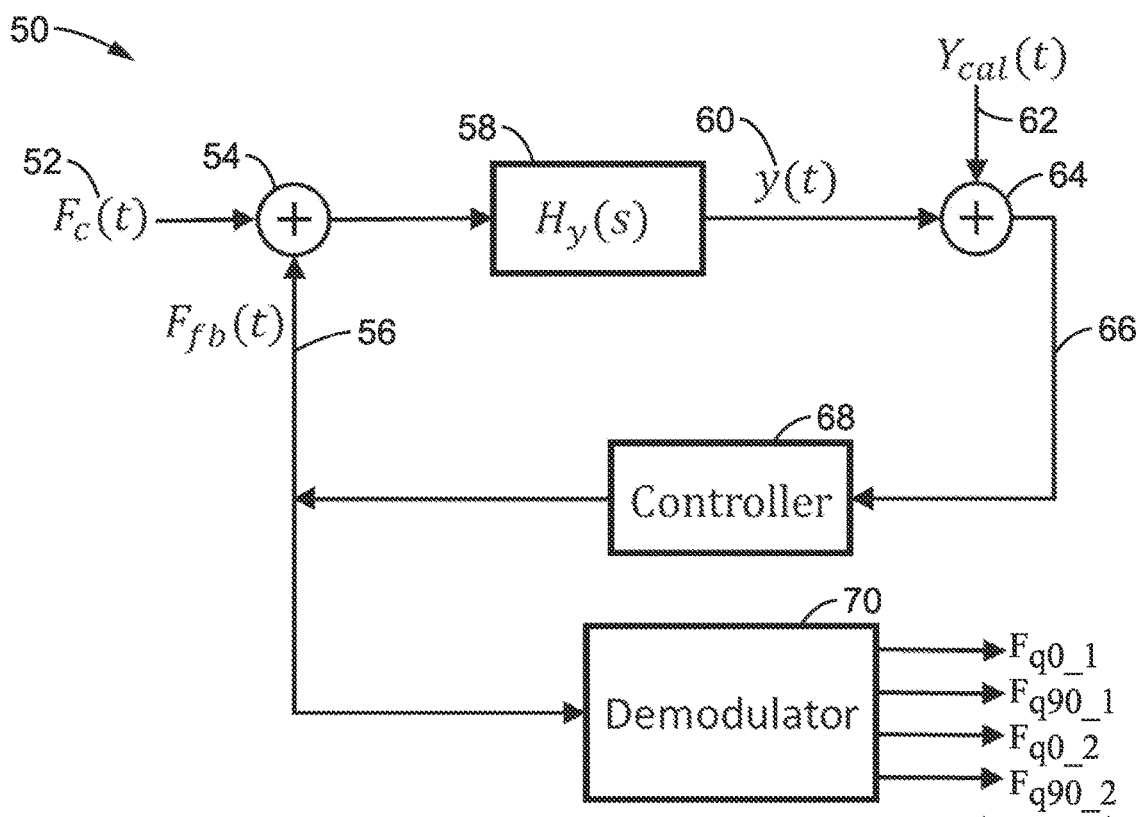
FIG. 3 is a block diagram of a sense resonator with feedback, calibration signal and demodulator, according to at least one embodiment of the present disclosure.

FIG. 3 illustrates an example embodiment 50 of feedback, calibrations and demodulation from the sense resonator. Similar to what was described for FIG. 2, an excitation force $F_c(t)$ 52 is summed 54 with feedback $F_{fb}(t)$ 56, the sum of which is input to sense resonator $H_y(s)$ 58. The signal amplitude at the output of sense resonator y(t) 60 is compared 64 to a calibration input $Y_{cal}(t)$ 62 with output 66 directed to controller 68 which generates feedback force $F_{fb}(t)$ 56 that is applied to the input of the resonator to null the vibration at the output of the sense resonator. A demodulator 70 is shown receiving the output from controller 68 and generating quadrature outputs 72.

The solution to the matching issue is to continuously tune $\omega_x$, $\omega_y$ or both. Doing so requires an accurate estimate of the difference, $\Delta\omega_{xy} = \omega_x - \omega_y$. Since in practice $\Delta\omega_{xy}$ often varies, for example due to environmental variations such as temperature, pressure, humidity, or package strain, the estimation has to be performed continuously while the gyroscope is in operation, as in measuring angular rate.

3.1. Two Tone Calibration

A calibration signal $Y_{cal}(t)$ is added to the output of the sense resonator (not the output of the whole system), as shown in FIG. 3. As an example, the derivation shown below assumes a calibration signal consisting of two tones at frequencies $\omega_{cal1}$ and $\omega_{cal2}$:

$$Y_{cal}(t) = \hat{Y}_{cal1} \cdot \cos(\omega_x t + \Theta_{err}) \sin(\omega_{cal1} t) + \hat{Y}_{cal2} \cdot \sin(\omega_x t + \Theta_{err}) \sin(\omega_{cal2} t). \quad (2)$$

It should be noted that both tones are modulated with carriers $\sin(\omega_x t + \Theta_{err})$ and $\cos(\omega_x t + \Theta_{err})$ that are synchronous with drive mode oscillation $\dot{x}(t) = \hat{X}\omega_x \cdot \sin(\omega_x t)$. $\Theta_{err}$ represents an arbitrary but constant phase shift and accounts for processing delay. For simplicity, $\hat{Y}_{cal1} = \hat{Y}_{cal2} = \hat{Y}_{cal}$ without loss of generality to implementations of the present disclosure.

While the analysis below assumes sinusoidal waveforms, other periodic signals may be utilized, such as square, triangle, and sawtooth waves and other waveforms that are modulated with carriers that are synchronous with the drive mode oscillation. Likewise, calibration signals with only one or more than two tones can be utilized without departing from the teachings of the present disclosure.

The analyses below assume amplitude modulated calibration terms, but it will be appreciated that any argument of the calibration waveforms, such as amplitude, phase, and/or frequency, can be modulated to obtain the benefits from the disclosed calibration technique.

The feedback force $F_{fb}(t)$ can be interpreted as in-phase and quadrature components, $F_i(t)$ and $F_q(t)$, corresponding to the Coriolis and quadrature forces, respectively. They are computed from $F_{fb}(t)$ as follows:

$$F_i(t) = 2F_{fb}(t) \cdot \sin(\omega_x t)$$

$$F_q(t) = 2F_{fb}(t) \cdot \cos(\omega_x t) \quad (3)$$

$F_i(t)$ and $F_q(t)$ are demodulated with the calibration signal carriers $\sin(\omega_{cal1} t)$, $\sin(\omega_{cal2} t)$ and their quadrature, $\cos(\omega_{cal1} t)$, $\cos(\omega_{cal2} t)$. Each demodulator output is passed through a low-pass filter with bandwidth typically less than the calibration frequencies to remove the images at $2\omega_{cal1}$ and $2\omega_{cal2}$, respectively. After filtering, the results are:

$$F_{i0\_1} = 2F_i(t)\sin(\omega_{cal1} t) = 4F_{fb}(t) \cdot \sin(\omega_x t)\sin(\omega_{cal1} t)$$

$$F_{i90\_1} = 2F_i(t)\cos(\omega_{cal1} t) = 4F_{fb}(t) \cdot \sin(\omega_x t)\cos(\omega_{cal1} t)$$

$$F_{q0\_1} = 2F_q(t)\sin(\omega_{cal1} t) = 4F_{fb}(t) \cdot \cos(\omega_x t)\sin(\omega_{cal1} t)$$

$$F_{q90\_1} = 2F_q(t)\cos(\omega_{cal1} t) = 4F_{fb}(t) \cdot \cos(\omega_x t)\cos(\omega_{cal1} t)$$

$$F_{i0\_2}=2F_i(t)\sin(\omega_{cal2}t)=4F_{fb}(t)\cdot\sin(\omega_x t)\sin(\omega_{cal2}t)$$

$$F_{i90\_2}=2F_i(t)\cos(\omega_{cal2}t)=4F_{fb}(t)\cdot\sin(\omega_x t)\cos(\omega_{cal2}t)$$

$$F_{q0\_2}=2F_q(t)\sin(\omega_{cal2}t)=4F_{fb}(t)\cdot\cos(\omega_x t)\sin(\omega_{cal2}t)$$

$$F_{q90\_2}=2F_q(t)\cos(\omega_{cal2}t)=4F_{fb}(t)\cdot\cos(\omega_x t)\cos(\omega_{cal2}t) \quad (4)$$

Taking into account force feedback and substituting $Y_{cal}(t)$ yields:

$$F_{q0\_1} = 2\hat{Y}_{cal}\cdot k_x \cdot \omega_x^{-1}\cdot\left(\Delta\omega_{xy}\cdot\cos(\Theta_{err}) + \frac{\omega_y}{2Q_y}\cdot\sin(\Theta_{err})\right) \quad (5)$$

$$F_{q90\_1} = 2\hat{Y}_{cal}\cdot k_x \cdot \omega_x^{-1}\cdot\omega_{cal1}\cdot\sin(\Theta_{err})$$

$$F_{q0\_2} = 2\hat{Y}_{cal}\cdot k_x \cdot \omega_x^{-1}\cdot\left(\frac{\omega_y}{2Q_y}\cdot\cos(\Theta_{err}) - \Delta\omega_{xy}\cdot\sin(\Theta_{err})\right)$$

$$F_{q90\_2} = 2\hat{Y}_{cal}\cdot k_x \cdot \omega_x^{-1}\cdot\omega_{cal2}\cdot\cos(\Theta_{err})$$

It should be noted that these signals do not contain the Coriolis force $F_c(t)$ and hence do not depend on angular rate $\Omega_z$.

First the phase error $\Theta_{err}$ is obtained:

$$\Theta_{err} = \tan^{-1}\left(\frac{F_{q90\_1}}{F_{q90\_2}}\cdot\frac{\omega_{cal2}}{\omega_{cal1}}\right) \quad (6)$$

Once the phase error is known, $\Delta\omega_{xy}$ and $Q_y$ can be found as follows:

$$\Delta\omega_{xy} = \frac{F_{q0\_1}\cdot\cos(\Theta_{err}) - F_{q0\_2}\cdot\sin(\Theta_{err})}{F_{q0\_1}\cdot\frac{\omega_{cal2}}{\omega_{cal1}}\cdot\sin(\Theta_{err}) + F_{q0\_2}\cdot\cos(\Theta_{err})}\cdot\omega_{cal2} \quad (7)$$

$$Q_y = \frac{F_{q90\_1}\cdot\frac{\omega_{cal2}}{\omega_{cal1}}\cdot\sin(\Theta_{err}) + F_{q90\_2}\cdot\cos(\Theta_{err})}{F_{q0\_1}\cdot\sin(\Theta_{err}) + F_{q0\_2}\cdot\cos(\Theta_{err})}\cdot\frac{\omega_y}{2\omega_{cal2}}$$

Equation (6) can also be used to force the phase error to zero by tuning the phase of the calibration signal. Equation (7) becomes with $\Theta_{err}=0$:

$$\Delta\omega_{xy} = \frac{F_{q0\_1}}{F_{q90\_2}}\cdot\omega_{cal2} \quad (8)$$

$$Q_y = \frac{F_{q90\_2}}{F_{q0\_1}}\cdot\frac{\omega_y}{2\omega_{cal2}}$$

Although not required for mode-matching, the extracted quality factor $Q_y$ of the sense resonator may be useful, such as for monitoring transducer degradation or bias error correction in situations where the bias error is dominated by damping.

Angular rate is obtained from the amplitude of Coriolis force $\hat{F}_c(t)$ of the in-phase component $F_i(t)$ of the feedback force. For simplicity, without loss of generality it is assumed here that $\Theta_{err}=0$.

$$F_i(t) = \underbrace{\hat{F}_c(t)}_{\text{Coriolis force}} + 2\hat{Y}_{cal}k_x\omega_x^{-1}\left(\frac{\omega_y}{2Q_y}\cdot\sin(\omega_{cal1}t) + \omega_{cal1}\cos(\omega_{cal1}t)\right) - \quad (9)$$

$$\underbrace{2\hat{Y}_{cal}k_x\omega_x^{-1}(\Delta\omega_{xy}\sin(\omega_{cal2}t) + \omega_{cal2}\cos(\omega_{cal2}t))}_{\text{Calibration tones at }\omega_{cal2}}$$

Accordingly, $F_i(t)$ equals the Coriolis force plus the calibration tones at the calibration frequencies $\omega_{cal1}$ and $\omega_{cal2}$. These tones can be estimated accurately using Equation (5) and subtracted from $F_i(t)$ to arrive at just the Coriolis force, $\hat{F}_c(t)$:

$$\hat{F}_c(t) = F_i(t) - F_{q0\_2}\sin(\omega_{cal1}t) - F_{q90\_2}\cos(\omega_{cal1}t)\cdot\frac{\omega_{cal1}}{\omega_{cal2}} + \quad (10)$$

$$F_{q0\_1}\sin(\omega_{cal2}t) + F_{q90\_1}\cos(\omega_{cal2}t)\cdot\frac{\omega_{cal2}}{\omega_{cal1}}$$

Using this equation, the amplitude of the Coriolis force can be obtained simultaneously with and independent of the calibration signal.

Angular rate $\Omega_z(t)$ can also be extracted from $\hat{F}_c(t)=2m\omega_x\hat{X}\alpha_z\cdot\Omega_z(t)$ accurately using $F_{q0\_2}$ as follows.

$$\Omega_z(t) = \frac{\hat{F}_c(t)}{F_{q90\_2}}\cdot\frac{\hat{Y}_{cal}}{\hat{X}}\cdot\frac{1}{\alpha_z}\cdot\omega_{cal2} \quad (11)$$

3.2. Single Tone Calibration

Two tone-calibration, described above, completely removes the calibration signal from the measured amplitude of the Coriolis force, $\hat{F}_c(t)$. However, unlike two-tone calibration, which suppresses leakage of the calibration into the measured rate output, single-tone calibration may require compromises in the choice of the frequency and amplitude of the calibration signal. The analysis below shows how to achieve accurate mode-matching with single-tone calibration and the possible penalty of the accuracy of the rate measurement result.

The calibration signal used is $$Y_{cal}(t)=\hat{Y}_{cal}\sin(\omega_{cal}t)\cos(\omega_x t) \quad (12)$$

A sinusoidal signal is used in this example. It should also be appreciated that just as in two-tone calibration, other signal shapes may be alternatively utilized without departing from teachings of the present disclosure, for example square waves and so forth.

The feedback force $F_{fb}(t)$ can be interpreted as in-phase and quadrature components, $F_i(t)$ and $F_q(t)$, corresponding to the Coriolis and quadrature forces, respectively. They are computed from $F_{fb}(t)$ as follows:

$$F_i(t)=2F_{fb}(t)\cdot\sin(\omega_x t)$$

$$F_q(t)=2F_{fb}(t)\cdot\cos(\omega_x t) \quad (13)$$

Angular rate and the estimated frequency split $\Delta\omega_{xy}$ are obtained by demodulating $F_i(t)$ and $F_q(t)$ with the calibration signal carrier $\sin(\omega_{cal}t)$ and its quadrature $\cos(\omega_{cal}t)$. The outputs are passed through a low-pass filter with bandwidth typically less than $\omega_{cal}$. After filtering the following is obtained:

$$F_{i0}=2F_i(t)\sin(\omega_{cal}t)=4F_{fb}(t)\cdot\sin(\omega_x t)\sin(\omega_{cal}t)$$

$$F_{i90}=2F_i(t)\cos(\omega_{cal}t)=4F_{fb}(t)\cdot\sin(\omega_x t)\cos(\omega_{cal}t)$$

$$F_{q0} = 2F_q(t)\sin(\omega_{cal}t) = 4F_{fb}(t)\cos(\omega_x t)\sin(\omega_{cal}t)$$

$$F_{q90} = 2F_q(t)\cos(\omega_{cal}t) = 4F_{fb}(t)\cos(\omega_x t)\cos(\omega_{cal}t) \quad (14)$$

Taking into account force feedback and substituting $Y_{cal}(t)$ yields:

$$F_{i0} = 2\hat{Y}_{cal} \cdot k_x \cdot \omega_x^{-1} \cdot \frac{\omega_y}{2Q_y} + 2F_c(t)\sin(\omega_{cal}t) \quad (15)$$

$$F_{i90} = 2\hat{Y}_{cal} \cdot k_x \cdot \omega_x^{-1} \cdot \omega_{cal} + 2F_c(t)\cos(\omega_{cal}t)$$

$$F_{q0} = 2\hat{Y}_{cal} \cdot k_x \cdot \omega_x^{-1} \cdot \Delta\omega_{xy}$$

$$F_{q90} = 0.$$

The in-phase quadrature force $F_{q0}$ is proportional to $\Delta\omega_{xy}$ and independent of the Coriolis force, $F_c(t)$. Analogous to two-tone calibration, it can be used as the input of a feedback controller that modifies $\omega_x$, $\omega_y$ or both to accurately force $F_{q0}$, and implicitly $\Delta\omega_{xy}$, to zero. Unlike other approaches to mode-matching that use sinusoidal calibration signals, this technique does not impose any restriction on the bandwidth of the rate input or the frequency of the calibration signal, $\omega_{cal}$. The advantage comes from modulating the calibration signal in-phase with the drive oscillation $\cos(\omega_x t)$.

Angular rate is obtained from the Coriolis force term $F_c(t)$ in the in-phase component $F_i(t)$ of the feedback force:

$$F_i(t) = \underbrace{\hat{F}_c(t)}_{\text{Coriolis force}} + \underbrace{2\hat{Y}_{cal}k_x\omega_x^{-1}\left(\frac{\omega_y}{2Q_y}\sin(\omega_{cal}t) + \omega_{cal}\cos(\omega_{cal}t)\right)}_{\text{Calibration tones at } \omega_{cal}} \quad (16)$$

As with two-tone calibration, feedforward cancellation can be used in principle to remove the tones and get $\hat{F}_c(t)$, not corrupted by the calibration signal:

$$\hat{F}_c(t) = F_i(t) - 2\hat{Y}_{cal}k_x\omega_x^{-1}\left(\frac{\omega_y}{2Q_y}\sin(\omega_{cal}t) + \omega_{cal}\cos(\omega_{cal}t)\right) \quad (17)$$

It should be appreciated that this expression depends on the spring constant $k_x$ of the drive mode resonator and the amplitude $\hat{Y}_{cal}$ of the calibration signal. These are challenging to estimate with sufficient precision without choosing $\omega_{cal}$ to be outside the bandwidth of the rate input or limiting $\hat{Y}_{cal}$, both of which limit the precision of mode-matching. In those situations, two-tone calibration may be preferable.

The aforementioned expressions and techniques are in terms of forces applied to, or generated by, the gyroscope transducer. Implementations typically will utilize proxies available in the circuit, such as measured voltages or currents (either analog or digital) to represent the same information. The equations presented here can be rewritten in terms of these proxies without loss of generality or departing from the teachings of the present disclosure.

4. General Scope of the Embodiments

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions described herein, and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following:

A force-feedback gyroscope apparatus, comprising: a first resonator as a drive resonator having an x-mode excited at its resonant frequency; a second resonator as a sense resonator having a y-mode which is driven by receiving a Coriolis force signal from the output of said first resonator; wherein said second resonator has a feedback signal which combines the y-mode output signal with a calibration signal that is synchronous with the excitation in the x-mode and modulated at one or more calibration frequencies within the bandwidth of the angular rate input.

A force-feedback gyroscope apparatus, comprising: a first resonator as a drive resonator having an x-mode excited at its resonant frequency; a second resonator as a sense resonator having a y-mode which is driven by receiving a Coriolis force signal from the output of said first resonator; wherein said second resonator has a feedback signal which combines the y-mode output signal with a calibration signal that is synchronous with the excitation in the x-mode and modulated at one or more calibration frequencies within the bandwidth of the angular rate input; and wherein the calibration signal, $Y_{cal}(t)$ is the sum of two or more periodic modulated signals with calibration frequencies $\omega_{cal1}$ and $\omega_{cal2}$ and carriers which are modulated in-phase and quadrature with the x-mode displacement and within the bandwidth of the angular rate input.

A method of mode matching a force-feedback gyroscope, comprising: exciting a first resonator, drive resonator, in an x-mode at its resonant frequency; performing sensing on a second resonator, sense resonator, having a y-mode which is driven by receiving a Coriolis force signal from the output of said first resonator; and combining a feedback signal from a y-mode output signal of said second resonator with at least one calibration signal that is synchronous with the excitation in the x-mode.

A force-feedback gyroscope with an x-mode and a y-mode, wherein the x-mode is excited at its resonant frequency, and wherein a calibration signal that is synchronous with the excitation in the x-mode is added to the y-mode.

The apparatus or method of any preceding implementation, wherein the calibration signal, $Y_{cal}(t)$, is the sum of two periodic signals with calibration frequencies $\omega_{cal1}$ and $\omega_{cal2}$ and carriers which are modulated in-phase and quadrature with the x-mode displacement.

The apparatus or method of any preceding implementation, wherein said calibration signal $Y_{cal}(t)$ is generated in response to the relation: $\hat{Y}_{cal1} \cdot \cos(\omega_x t + \Theta_{err}) \sin(\omega_{cal1} t)^\circ \hat{Y}_{cal2} \cdot \sin(\omega_x t + \Theta_{err}) \sin(\omega_{cal2} t)$; and wherein $\hat{Y}_{cal1}$ is a first calibration input, $\omega_x$ is the tone frequency of the x-mode of said first resonator, t is time, $\omega_{cal1}$ is a first calibration tone frequency and $\omega_{cal2}$ is the second calibration tone, and $\theta_{err}$ represents an arbitrary but constant phase shift and accounts for processing delay.

The apparatus or method of any preceding implementation, further comprising: a demodulator coupled to the feedback signal $F_{fb}(t)$ of said sense resonator; and said demodulator configured for demodulating in-phase and quadrature components $F_i(t)$ and $F_q(t)$ of feedback signal $F_{fb}(t)$ and outputting in-phase signals and quadrature signals at 0 and 90 degrees, as $F_{i0}$, $F_{i90}$, $F_{q0}$, and $F_{q90}$ for one or more calibration frequencies.

The apparatus or method of any preceding implementation, further comprising: a demodulator coupled to the feedback signal $F_{fb}(t)$ of said sense resonator; and wherein said demodulator is configured for demodulating in-phase and quadrature components $F_i(t)$ and $F_q(t)$ of feedback signal $F_{fb}(t)$ and outputting in-phase signals and quadrature signals at 0 and 90 degrees, are determined at two calibration frequencies $\omega_{cal1}$ and $\omega_{cal2}$ as $F_{i0\_1}$, $F_{i90\_1}$, $F_{q0\_1}$, $F_{q90\_1}$, $F_{i0\_2}$, $F_{i90\_2}$, $F_{q0\_2}$, and $F_{q90\_2}$.

The apparatus or method of any preceding implementation, further comprising determining phase error $\Theta_{err}$ by measuring the ratio between 90° phase shifted responses of the quadrature channel to the first and second calibration signals.

The apparatus or method of any preceding implementation, wherein said determining of the phase error $\Theta_{err}$ is given by $$\tan^{-1}\left(\frac{F_{q90\_1}}{F_{q90\_2}} \cdot \frac{\omega_{cal2}}{\omega_{cal1}}\right).$$

The apparatus or method of any preceding implementation, wherein said phase error $\Theta_{err}$ is nulled using feedback.

The apparatus or method of any preceding implementation, wherein the difference of resonant frequencies $\Delta\omega_{xy}$ of the x-mode and y-mode, and the y-mode quality factor $Q_y$ are estimated by measuring the response of the quadrature channel to the first and second calibration signals.

The apparatus or method of any preceding implementation, wherein the difference of resonant frequencies $\Delta\omega_{xy}$ of the x-mode and y-mode, and the y-mode quality factor $Q_y$ are estimated as follows:

$$\Delta\omega_{xy} = \frac{F_{q0\_1} \cdot \cos(\Theta_{err}) - F_{q0\_2} \cdot \sin(\Theta_{err})}{F_{q90\_1} \cdot \frac{\omega_{cal2}}{\omega_{cal1}} \cdot \sin(\Theta_{err}) + F_{q90\_2} \cdot \cos(\Theta_{err})} \cdot \omega_{cal2}$$

$$Q_y = \frac{F_{q90\_1} \cdot \frac{\omega_{cal2}}{\omega_{cal1}} \cdot \sin(\Theta_{err}) + F_{q90\_2} \cdot \cos(\Theta_{err})}{F_{q0\_1} \cdot \sin(\Theta_{err}) + F_{q0\_2} \cdot \cos(\Theta_{err})} \cdot \frac{\omega_y}{2\omega_{cal2}}.$$

The apparatus or method of any preceding implementation, wherein the estimate $\Delta\omega_{xy}$ is nulled using feedback.

The apparatus or method of any preceding implementation, wherein the Coriolis force term $\hat{F}_c(t)$ is independent of the calibration signal, and determined by the cancellation of the error tones in the rate channel using the measured response of the quadrature channel to calibration signals, whereby Coriolis force amplitude is obtained simultaneously, and independent from, the calibration signal.

The apparatus or method of any preceding implementation, wherein the Coriolis force term $\hat{F}_c(t)$ is determined as $$F_i(t) - F_{q0\_2}\sin(\omega_{cal1}t) - F_{q90\_2}\cos(\omega_{cal1}t) \cdot \frac{\omega_{cal1}}{\omega_{cal2}} +$$

$$F_{q0\_1}\sin(\omega_{cal2}t) + F_{q90\_1}\cos(\omega_{cal2}t) \cdot \frac{\omega_{cal2}}{\omega_{cal1}}.$$

The apparatus or method of any preceding implementation, further comprising determining an angular rate $\Omega_z(t)$ is extracted accurately from the Coriolis force term by estimating the gain between the angular rate and the final output, also referred to as scale factor, and sensitivity of a force-rebalance gyroscope using the measured response of the quadrature channel to the calibration signal applied at the sense mode resonator output.

The apparatus or method of any preceding implementation, further comprising determining an angular rate $\Omega_z(t)$ as $$\frac{\hat{F}_c(t)}{F_{q90\_2}} \cdot \frac{\hat{Y}_{cal}}{\hat{X}} \cdot \frac{1}{\alpha_z} \cdot \omega_{cal2}.$$

The apparatus or method of any preceding implementation, wherein the calibration signal comprises a single tone at frequency $\omega_{cal}$ modulated with a carrier that has a constant phase relationship with the motion in the x-mode.

The apparatus or method of any preceding implementation, wherein the difference of resonant frequencies $\Delta\omega_{xy}$ of the x-mode and y-mode is nulled by minimizing the force $F_{q0}$.

The apparatus or method of any preceding implementation, wherein the difference of resonant frequencies $\Delta\omega_{xy}$ of the x-mode and y-mode is nulled by setting $F_{q0}$ to 0 as follows:

$$F_{i0} = 2\hat{Y}_{cal} \cdot k_x \cdot \omega_x^{-1} \cdot \frac{\omega_y}{2Q_y} + 2F_c(t)\sin(\omega_{cal}t);$$

$$F_{i90} = 2\hat{Y}_{cal} \cdot k_x \cdot \omega_x^{-1} \cdot \omega_{cal} + 2F_c(t)\cos(\omega_{cal}t);$$

$$F_{q0} = 2\hat{Y}_{cal} \cdot k_x \cdot \omega_x^{-1} \cdot \Delta\omega_{xy}; \text{ and}$$

$$F_{q90} = 0.$$

The apparatus or method of any preceding implementation, wherein the Coriolis force term $\hat{F}_c(t)$ is estimated by the cancellation of the error tones due to the applied calibration signal using the pre-characterized or predicted system parameters.

The apparatus or method of any preceding implementation, wherein the Coriolis force term $\hat{F}_c(t)$ is estimated by $$F_i(t) - 2\hat{Y}_{cal} k_x \omega_x^{-1}\left(\frac{\omega_y}{2Q_y}\sin(\omega_{cal}t) + \omega_{cal}\cos(\omega_{cal}t)\right).$$

The apparatus or method of any preceding implementation, wherein the calibration signal, $Y_{cal}(t)$, is the sum of two or more modulated signals in which at least one of the amplitude, phase, or frequency arguments are modulated at different calibration frequencies with carriers having different phase relationships with respect to the drive mode displacement.

The apparatus or method of any preceding implementation, wherein the calibration signal is added to the output of the y-mode.

The apparatus or method of any preceding implementation, wherein the calibration signal is the sum of two sinusoids with calibration frequencies $\omega_{cal1}$ and $\omega_{cal2}$ and carriers modulated in-phase and quadrature with the x-mode displacement, respectively as shown in Equation (2).

The apparatus or method of any preceding implementation, wherein the phase error in the system is estimated using Equation (6).

The apparatus or method of any preceding implementation, wherein the estimate of the phase error is nulled using feedback.

The apparatus or method of any preceding implementation, wherein the difference of resonant frequencies $\Delta\omega_{xy}$ of the x-mode and y-mode and the y-mode damping $Q_y$ are estimated using Equations (7).

The apparatus or method of any preceding implementation, wherein the estimate $\Delta\omega_{xy}$ is nulled using feedback.

The apparatus or method of any preceding implementation, wherein the Coriolis force term independent of the calibration signal is derived from Equation (10).

The apparatus or method of any preceding implementation, wherein angular rate is extracted accurately from the Coriolis force term as shown in Equation (11).

The apparatus or method of any preceding implementation, wherein the calibration signal is a single tone at frequency $\omega_{cal}$ modulated with a carrier that has a constant phase relationship with the motion in the x-mode.

The apparatus or method of any preceding implementation, wherein the difference of resonant frequencies $\Delta\omega_{xy}$ of the x-mode and y-mode is nulled by minimizing the force $F_{q0}$ in Equation (15).

The apparatus or method of any preceding implementation, wherein the Coriolis force term is estimated using Equation (17).

Each and every embodiment of the technology described herein, as well as any aspect, component, or element of any embodiment described herein, and any combination of aspects, components or elements of any embodiment described herein.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing a group of elements, indicates that at least one of these group elements is present, which includes any possible combination of the listed elements as applicable.

References in this disclosure referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

As used herein, the term "set" refers to a collection of one or more objects. Thus, for example, a set of objects can include a single object or multiple objects.

Relational terms such as first and second, top and bottom, and the like may be used solely to distinguish one entity or action from another entity or action without necessarily requiring or implying any actual such relationship or order between such entities or actions.

The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element.

As used herein, the terms "approximately", "approximate", "substantially", "essentially", and "about", or any other version thereof, are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

The term "coupled" as used herein is defined as connected, although not necessarily directly and not necessarily mechanically. A device or structure that is "configured" in a certain way is configured in at least that way, but may also be configured in ways that are not listed.

Benefits, advantages, solutions to problems, and any element(s) that may cause any benefit, advantage, or solution to occur or become more pronounced are not to be construed as a critical, required, or essential features or elements of the technology describes herein or any or all the claims.

In addition, in the foregoing disclosure various features may be grouped together in various embodiments for the purpose of streamlining the disclosure. This method of disclosure is not to be interpreted as reflecting an intention that the claimed embodiments require more features than are expressly recited in each claim. Inventive subject matter can lie in less than all features of a single disclosed embodiment.

The abstract of the disclosure is provided to allow the reader to quickly ascertain the nature of the technical disclosure. It is submitted with the understanding that it will not be used to interpret or limit the scope or meaning of the claims.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

The following claims are hereby incorporated into the disclosure, with each claim standing on its own as a separately claimed subject matter.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. A force-feedback gyroscope apparatus, comprising:
   a first resonator as a drive resonator having an x-mode excited at its resonant frequency;
   a second resonator as a sense resonator having a y-mode which is driven by receiving a Coriolis force signal from the output of said first resonator;
   wherein said second resonator has a feedback signal which combines the y-mode output signal with a calibration signal that is synchronous with the excitation in the x-mode, and modulated at one or more calibration frequencies within the bandwidth of the angular rate input;
   wherein the calibration signal, $Y_{cal}(t)$, is the sum of two periodic signals with calibration frequencies $\omega_{cal1}$ and $\omega_{cal2}$ and carriers which are modulated in-phase and quadrature with the x-mode displacement;
   wherein said calibration signal $Y_{cal}(t)$ is generated in response to the relation:
   $\hat{Y}_{cal1} \cdot \cos(\omega_x t + \Theta_{err}) \sin(\omega_{cal1} t) + \hat{Y}_{cal2} \cdot \sin(\omega_x t + \Theta_{err}) \sin(\omega_{cal2} t)$; and
   wherein $\hat{Y}_{cal1}$ is a first calibration input, $\omega_x$ is the tone frequency of the x-mode of said first resonator, t is time, $\omega_{cal1}$ is a first calibration tone frequency and $\omega_{cal2}$ is the second calibration tone, and $\Theta_{err}$ represents an arbitrary but constant phase shift and accounts for processing delay.

2. The gyroscope apparatus of claim 1, further comprising:
   a demodulator coupled to the feedback signal $F_{fb}(t)$ of said sense resonator; and
   wherein said demodulator is configured for demodulating in-phase and quadrature components $F_i(t)$ and $F_q(t)$ of feedback signal $F_{fb}(t)$ and outputting in-phase signals and quadrature signals at 0 and 90 degrees, as $F_{i0}$, $F_{i90}$, $F_{q0}$, and $F_{q90}$, for one or more calibration frequencies.

3. The gyroscope apparatus of claim 1, further comprising:
a demodulator coupled to the feedback signal $F_{fb}(t)$ of said sense resonator; and
wherein said demodulator is configured for demodulating in-phase and quadrature components $F_i(t)$ and $F_q(t)$ of feedback signal $F_{fb}(t)$ and outputting in-phase signals and quadrature signals at 0 and 90 degrees, are determined at two calibration frequencies $\omega_{cal1}$ and $\omega_{cal2}$ as $F_{i0\_1}$, $F_{i90\_1}$, $F_{q0\_1}$, $F_{q90\_1}$, $F_{i0\_2}$, $F_{i90\_2}$, $F_{q0\_2}$, and $F_{q90\_2}$.

4. The gyroscope apparatus of claim 3, further comprising determining phase error $\Theta_{err}$ by measuring the ratio between 90° phase shifted responses of the quadrature channel to the first and second calibration signals.

5. The gyroscope apparatus of claim 4, wherein said determining of the phase error $\Theta_{err}$ is given by $$\tan^{-1}\left(\frac{F_{q90\_1}}{F_{q90\_2}} \cdot \frac{\omega_{cal2}}{\omega_{cal1}}\right).$$

6. The gyroscope apparatus of claim 4, wherein said phase error $\Theta_{err}$ is nulled using feedback.

7. The gyroscope apparatus of claim 4, wherein a difference of resonant frequencies $\Delta\omega_{xy}$ of the x-mode and y-mode, and a y-mode quality factor $Q_y$ are estimated by measuring the response of the quadrature channel to the first and second calibration signals.

8. The gyroscope apparatus of claim 7, wherein the difference of resonant frequencies $\Delta\omega_{xy}$ of the x-mode and y-mode, and the y-mode quality factor $Q_y$ are estimated as follows:

$$\Delta\omega_{xy} = \frac{F_{q0\_1} \cdot \cos(\Theta_{err}) - F_{q0\_2} \cdot \sin(\Theta_{err})}{F_{q90\_1} \cdot \frac{\omega_{cal2}}{\omega_{cal1}} \cdot \sin(\Theta_{err}) + F_{q90\_2} \cdot \cos(\Theta_{err})} \cdot \omega_{cal2}$$

$$Q_y = \frac{F_{q90\_1} \cdot \frac{\omega_{cal2}}{\omega_{cal1}} \cdot \sin(\Theta_{err}) + F_{q90\_2} \cdot \cos(\Theta_{err})}{F_{q0\_1} \cdot \sin(\Theta_{err}) + F_{q0\_2} \cdot \cos(\Theta_{err})} \cdot \frac{\omega_y}{2\omega_{cal2}}.$$

9. The gyroscope apparatus of claim 7, wherein the estimate $\Delta\omega_{xy}$ is nulled using feedback.

10. The gyroscope apparatus of claim 3, wherein the Coriolis force term $\hat{F}_c(t)$ is independent of the calibration signal, and determined by the cancellation of the error tones in the rate channel using the measured response of the quadrature channel to calibration signals, whereby Coriolis force amplitude is obtained simultaneously, and independent from, the calibration signal.

11. The gyroscope apparatus of claim 10, wherein the Coriolis force term $\hat{F}_c(t)$ is determined as $$F_i(t) - F_{q0\_2}\sin(\omega_{cal1}t) - F_{q90\_2}\cos(\omega_{cal1}t) \cdot \frac{\omega_{cal1}}{\omega_{cal2}} + F_{q0\_1}\sin(\omega_{cal2}t) + F_{q90\_1}\cos(\omega_{cal2}t) \cdot \frac{\omega_{cal2}}{\omega_{cal1}}.$$

12. The gyroscope apparatus of claim 10, further comprising determining an angular rate $\Omega_z(t)$ is extracted accurately from the Coriolis force term by estimating the gain between the angular rate and the final output, also referred to as scale factor, and sensitivity of a force-rebalance gyroscope using the measured response of the quadrature channel to the calibration signal applied at the sense mode resonator output.

13. The gyroscope apparatus of claim 12, further comprising determining an angular rate $\Omega_z(t)$ as $$\frac{\hat{F}_c(t)}{F_{q90\_2}} \cdot \frac{\hat{Y}_{cal}}{\hat{X}} \cdot \frac{1}{\alpha_z} \cdot \omega_{cal2}.$$

14. The gyroscope apparatus of claim 2, wherein the calibration signal comprises a single tone at frequency $\omega_{cal}$ modulated with a carrier that has a constant phase relationship with the motion in the x-mode.

15. The gyroscope apparatus of claim 14, wherein the difference of resonant frequencies $\Delta\omega_{xy}$ of the x-mode and y-mode is nulled by minimizing the force $F_{q0}$.

16. The gyroscope apparatus of claim 15, wherein the difference of resonant frequencies $\Delta\omega_{xy}$ of the x-mode and y-mode is nulled by setting $F_{q0}$ to 0 as follows:

$$F_{i0} = 2\hat{Y}_{cal} \cdot k_x \cdot \omega_x^{-1} \cdot \frac{\omega_y}{2Q_y} + 2F_c(t)\sin(\omega_{cal}t);$$

$$F_{i90} = 2\hat{Y}_{cal} \cdot k_x \cdot \omega_x^{-1} \cdot \omega_{cal} + 2F_c(t)\cos(\omega_{cal}t);$$

$$F_{q0} = 2\hat{Y}_{cal} \cdot k_x \cdot \omega_x^{-1} \cdot \Delta\omega_{xy}; \text{ and}$$

$$F_{q90} = 0.$$

17. The gyroscope apparatus of claim 14, wherein the Coriolis force term $\hat{F}_c(t)$ is estimated by the cancellation of the error tones due to the applied calibration signal using the pre-characterized or predicted system parameters.

18. The gyroscope apparatus of claim 17, wherein the Coriolis force term $\hat{F}_c(t)$ is estimated by $$F_i(t) - 2\hat{Y}_{cal}k_x\omega_x^{-1}\left(\frac{\omega_y}{2Q_y}\sin(\omega_{cal}t) + \omega_{cal}\cos(\omega_{cal}t)\right).$$

* * * * *